(12) United States Patent
Schünemann

(10) Patent No.: US 12,491,778 B2
(45) Date of Patent: Dec. 9, 2025

(54) SPLASH-PROOF CHARGING PORT HOUSING FOR AN ELECTRICALLY DRIVABLE MOTOR VEHICLE

(71) Applicant: Dr. Ing. h.c. F. Porsche Aktiengesellschaft, Stuttgart (DE)

(72) Inventor: Alexander Schünemann, Fellbach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 655 days.

(21) Appl. No.: 17/900,951

(22) Filed: Sep. 1, 2022

(65) Prior Publication Data
US 2023/0070585 A1     Mar. 9, 2023

(30) Foreign Application Priority Data
Sep. 6, 2021   (DE) .................. 10 2021 122 945.6

(51) Int. Cl.
*B60L 53/16*     (2019.01)
*B60L 50/64*     (2019.01)
*H01R 13/52*     (2006.01)

(52) U.S. Cl.
CPC ............ *B60L 53/16* (2019.02); *B60L 50/64* (2019.02); *H01R 13/5202* (2013.01); *H01R 2201/26* (2013.01)

(58) Field of Classification Search
None
See application file for complete search history.

(56) References Cited

U.S. PATENT DOCUMENTS 5,816,643 A * 10/1998 Itou ...................... H01R 13/447
439/310
9,533,583 B2   1/2017 Eberle
(Continued)

FOREIGN PATENT DOCUMENTS

CN        212676521 U     3/2021
CN        213261991 U     5/2021
(Continued)

OTHER PUBLICATIONS

Office Action issued May 31, 2024, by the Swedish Patent and Registration Office (PRV), in corresponding Swedish Patent Application No. 2251022-6. (5 pages).
(Continued)

*Primary Examiner* — Tho D Ta
(74) *Attorney, Agent, or Firm* — Buchanan Ingersoll & Rooney PC

(57) ABSTRACT

A charging port housing for selectively connecting a charging cable provided for charging an electrically drivable motor vehicle including a lower shell which can be positioned at a charging opening of a motor vehicle body. The lower shell includes a socket opening for receiving a plug socket for the charging cable, and an upper shell fastened to the lower shell. The upper shell includes a through-opening for passing the charging cable to the plug socket, wherein at least one drain opening bounded by both the lower shell and the upper shell is provided for the gravity-driven drainage of liquid. Configuring the drain opening as a recess between the shells of the charging port housing makes it possible to cost-effectively implement a water drainage of splash water entering via the through-opening, and thus enable a cost-effective protection of electrical components of a motor vehicle against dust and splash water.

8 Claims, 2 Drawing Sheets

(56) References Cited

U.S. PATENT DOCUMENTS

| | | | |
|---|---|---|---|
| 9,819,116 B1* | 11/2017 | Baughman | B60R 13/07 |
| 11,459,036 B2* | 10/2022 | Nakanishi | B62D 25/12 |
| 2009/0266835 A1 | 10/2009 | Zentner | |
| 2013/0249486 A1 | 9/2013 | Eberle | |
| 2015/0191093 A1* | 7/2015 | Yamamaru | B60L 53/16 |
| | | | 320/109 |
| 2019/0039468 A1 | 2/2019 | Buettner et al. | |

FOREIGN PATENT DOCUMENTS

| | | |
|---|---|---|
| DE | 102008020538 A1 | 10/2009 |
| DE | 102012102419 A1 | 9/2013 |
| DE | 102013222686 A1 | 5/2015 |
| DE | 102016206002 A1 | 10/2017 |
| DE | 102019100787 A1 | 7/2020 |
| DE | 102019118910 A1 | 12/2020 |
| DE | 102019130551 A1 | 5/2021 |
| EP | 2899048 A1 | 7/2015 |
| JP | 2010036858 A | 2/2010 |
| JP | 2017208227 A | 11/2017 |

OTHER PUBLICATIONS

Swedish Office Action for Swedish Application No. 2251022-6, dated Mar. 29, 2023, 7 pages.

German Examination Report issued Oct. 16, 2025, by the German Patent and Trademark Office in corresponding German Patent Application No. 10 2021 122 945.6 with an English translation. (12 pages).

* cited by examiner

SPLASH-PROOF CHARGING PORT HOUSING FOR AN ELECTRICALLY DRIVABLE MOTOR VEHICLE

CROSS-REFERENCE TO RELATED APPLICATION

This application claims priority to German Patent Application No. 10 2021 122 945.6, filed Sep. 6, 2021, the content of such application being incorporated by reference herein in its entirety.

FIELD OF THE INVENTION

The invention relates to a charging port housing for an electrically drivable motor vehicle, via which a charging cable can be connected and which cost-effectively protects electrical components against dust and splash water.

BACKGROUND OF THE INVENTION

EP 2 899 048 A1, which is incorporated by reference herein, discloses a charging port housing for an electrically drivable motor vehicle, in which a, in Z-direction lower, base is inclined toward the center of the vehicle, in which collecting pockets that are spaced apart from one another are formed by a back of the lower base which projects upward in Z-direction, in the center of each of which a drain opening for draining splash water is provided.

SUMMARY OF THE INVENTION

There is a constant need to cost-effectively protect the electrical components of a motor vehicle against dust and splash water.

The charging port housing described herein enables cost-effective protection of electrical components of a motor vehicle against dust and splash water.

Preferred embodiments of the invention are specified in the subclaims and the following description, each of which can individually or in combination constitute an aspect of the invention.

One embodiment relates to a charging port housing for selectively connecting a charging cable provided for charging an electrically drivable motor vehicle comprising a lower shell which can be positioned at a charging opening of a motor vehicle body, wherein the lower shell comprises a socket opening for receiving a plug socket for the charging cable, and an upper shell fastened to the lower shell, wherein the upper shell comprises a through-opening for passing the charging cable to the plug socket, wherein at least one drain opening bounded by both the lower shell and the upper shell is provided for the gravity-driven drainage of liquid.

The lower shell and/or the upper shell of the charging port housing can already provide sufficient contact protection for electrical components that would otherwise be accessible when the charging cable is connected to the plug socket. The upper shell can also already keep a large amount of splash water and/or rainwater away from the electrical components. Should water nonetheless enter the charging port housing via the through-opening of the upper shell, in particular during a period of time in which the through-opening is opened by a charging lid but the charging cable is not yet inserted into the plug socket, the water can be directed in an intermediate space kept free between the lower shell and the upper shell away from electrical components via a suitable three-dimensional geometry of the sides of the lower shell and the upper shell which face one another and, under the effect of gravity, ultimately arrive at the at least one drain opening and be discharged, in particular to the environment. The lower shell and/or the upper shell can comprise webs, for example, which project into the intermediate space and block contact of splash water with electrical components, and preferably deflect the splash water that arrives at said web toward the drain opening and/or allow it to drip off.

The lower shell and the upper shell are in particular made of a plastic material, so that the three-dimensional design of the lower shell and the upper shell can easily be produced by plastic injection molding. Since the drain opening is not configured as an opening provided exclusively in the lower shell or exclusively in the upper shell, but is rather bounded in part by the lower shell and in part by the upper shell, there is no need to create the drain opening during production by plastic injection molding with the aid of a core or later by machining. Instead, it is possible to provide the drain opening by suitably shaping an edge region of the lower shell and/or the upper shell, so that the drain opening results automatically as a recess between the lower shell and the upper shell when the charging port housing is assembled. Configuring the drain opening as a recess between the lower shell and the upper shell of the charging port housing makes it possible to cost-effectively implement a water drainage of splash water entering via the through-opening, and thus enable a cost-effective protection of electrical components of a motor vehicle against dust and splash water.

The plug socket, into which a plug of the charging cable can be inserted, can be fastened in the socket opening of the lower shell. The plug socket can be positioned spaced apart from the through-opening of the upper shell, and also to an optionally provided charging lid for closing the through-opening toward the center of the vehicle. This makes it possible for the socket opening to be spaced apart from the through-opening, and for splash water and/or rainwater to enter an intermediate space configured between the lower shell and the upper shell via a gap between the lower shell and the upper shell in the region of the through-opening of the upper shell. The through-opening is dimensioned such that a plug of the charging cable which can be connected to the plug socket, can be inserted into the plug socket through the through-opening. Even when the charging cable is plugged in, there is a gap between the charging cable or the plug of the charging cable and the inner edge of the through-opening, via which dust and splash water can enter and be discharged via the drain opening. Since the splash water is drained off by gravity, there is no need for an external conveyor system for draining the splash water. For this purpose, the drain opening can be provided at a low location in the direction of gravity, to which the splash water that has entered the intermediate space between the lower shell and the upper shell can be directed. Apart from the through-opening provided in the upper shell, the upper shell can in particular largely or even completely cover the lower shell.

By means of the upper shell, which, apart from the at least one drain opening, is connected to the lower shell in an in particular liquid-tight manner, the charging port housing can provide a IP54 type of protection in accordance with ISO 20653:2013, which is incorporated by reference herein, for the charging port housing. All of the provided drain openings are in particular bounded exclusively by the lower shell and the upper shell. There is consequently no need for other components to achieve a drainage of splash water. Instead, by being configured with the aid of the lower shell and the upper shell, the at least one drain opening can be integrated into the housing as an integral part of the charging port housing.

An intermediate space for receiving components, in particular live wires electrically connected to the plug socket, is in particular configured between the lower shell and the upper shell, wherein the at least one drain opening communicates with the intermediate space. Electrical components, which can in particular interact electrically with the plug socket and/or the charging cable, can be provided in the intermediate space. One example of an electrical component provided in the intermediate space is a protective conductor that is electrically coupled to the plug socket in order to provide additional contact protection and thus prevent injury to a person by electric shock. Additionally or alternatively, a sensor system supplied with electrical energy can be provided as an electrical component in the intermediate space, which can, for example, indicate a readiness for charging by means of a control light and/or detect measured values relevant to the charging process at the interface between the plug socket and the charging cable. Splash water that has entered the intermediate space can be kept away from the electrical components by gravity and discharged via the at least one drain opening that communicates with the intermediate space.

It is preferably provided that an edge piece which forms an edge of the drain opening, in particular spaced apart from the drain opening in the Z-direction, forms a drainage ramp which is beveled in the Z-direction and leads away from the drain opening. The splash water can thus first be directed out of the intermediate space via the drain opening and then away outside the intermediate space via the drainage ramp toward the center of the vehicle to an outer side of the motor vehicle body of the motor vehicle in which the charging port housing can be installed. The splash water can in particular be directed to an inner side of the motor vehicle body and can drip down along the inner side of the motor vehicle body into the environment. There is thus no need to provide a defined path in the interior the motor vehicle for the splash water to be drained from the charging port housing. The edge piece is in particular formed in one piece with the lower shell, so that a low number of components can be achieved. The edge piece can in particular comprise a tab, which projects downward substantially in the Z-direction from the edge of the drain opening and from which the drainage ramp can project at an angle downward in the Z-direction spaced apart from the drain opening. Apart from the through-opening provided in the upper shell and the edge piece which projects from the drain opening, the upper shell can in particular largely or even completely cover the lower shell.

An X-direction is understood to mean a coordinate direction along a longitudinal axis of a motor vehicle when the charging port housing is installed in the motor vehicle. The X-direction extends substantially horizontally when the motor vehicle is parked on a flat horizontal surface. A Y-direction is understood to mean a coordinate direction along a transverse axis of a motor vehicle when the charging port housing is installed in the motor vehicle. The Y-direction extends substantially horizontally when the motor vehicle is parked on a flat horizontal surface. A Z-direction is understood to mean a coordinate direction along a vertical axis of a motor vehicle when the charging port housing is installed in the motor vehicle. The Z-direction extends substantially vertically when the motor vehicle is parked on a flat horizontal surface. The X-direction, the Y-direction, and the Z-direction are oriented orthogonally to one another.

Particularly preferably, at least one rib which projects upward from the drainage ramp with a component in the Z-direction is provided. The at least one rib is in particular formed in one piece with the edge piece. The at least one rib preferably projects from both the tab of the edge piece and the drainage ramp, whereby the rib abuts both the tab and the drainage ramp without interruption along its entire extent and thus in a liquid-tight manner. With its free end that faces away from the lower shell, the rib, which is formed integrally by the lower shell, for example, can abut the edge of the drain opening formed by the upper shell.

The at least one rib in particular forms a side wall which delimits a flow cross-section and/or a stabilizing rib which is spaced apart from an edge of the drainage ramp and in particular stiffens the drainage ramp. The drainage ramp can thus be part of a, for example U-shaped, drainage channel. The drainage ramp is furthermore stabilized in a torsion-resistant manner by the at least one rib.

When the charging port housing is inclined relative to the direction of gravity, the at least one rib preferably forms a drainage ramp for draining liquid. This takes into account that the motor vehicle, in which the charging port housing can be installed, does not necessarily have to be parked on a horizontal surface but can be oriented at an angle to the horizontal. The at least one rib makes it possible to delimit a V-shaped drainage channel between the drainage ramp and the rib, so that the splash water discharged via the drain opening does not run down the side of the drainage ramp immediately after passing through the drain opening. The dripping of splash water at a distance from the upper shell can also be ensured when the motor vehicle is inclined at an angle to the horizontal.

Particularly preferably, at least two drain openings are configured, which are spaced apart from one another in a direction transverse to the Z-direction. The splash water can be drained from the intermediate space between the lower shell and the upper shell via one of the drain openings, irrespective of the direction in which the motor vehicle with the charging port housing is inclined to the horizontal.

The at least one drain opening is in particular disposed in a corner region of the intermediate space, wherein, when the charging port housing is inclined relative to the direction of gravity, the drain opening is positioned at a lowest point of the intermediate space with respect to the direction of gravity. When the motor vehicle is inclined, the corner region of the intermediate space can act like a funnel and direct the splash water that arrives in the respective corner region to the associated drain opening. This makes it possible to ensure that, in almost any inclined position of the motor vehicle relative to the horizontal, all of the splash water that has entered the intermediate space can be discharged.

A charging flap which can be pivoted between a closed position and an open position is preferably provided, wherein the charging flap is articulated on the lower shell and, in the closed position, closes the through-opening of the upper shell, in particular in a liquid-tight manner. If no charging cable is connected to the plug socket, the through-opening can be closed by the charging flap, so that unnecessary ingress of splash water and dust can be avoided. The charging flap can be connected in an articulated manner to the lower shell through the upper shell and/or through a U-shaped recess in the upper shell. Since the socket opening of the lower shell already has to accommodate and mechanically support the plug socket, the lower shell is sufficiently stable to also be able to dissipate the joint forces and weight forces of the charging flap. The upper shell can thus be designed for lower loads and produced correspondingly cost-effectively, for example due to a lower material thickness.

Another embodiment relates to an electrically drivable motor vehicle comprising an electric machine for driving the motor vehicle, a rechargeable traction battery connected to the electric machine for storing and supplying electrical energy, a plug socket connected to the traction battery for charging the traction battery with external electrical energy, a motor vehicle body and a charging port housing which is provided at a charging opening of the motor vehicle body and can be configured and further developed as described above, wherein the plug socket is fastened in the socket opening of the lower shell. Configuring the drain opening as a recess between the lower shell and the upper shell of the charging port housing makes it possible to cost-effectively implement a water drainage of splash water entering via the through-opening, and thus enable a cost-effective protection of electrical components of a motor vehicle against dust and splash water.

BRIEF DESCRIPTION OF THE DRAWINGS

The invention will be explained in the following by way of example with reference to the accompanying drawings and using preferred design examples, wherein the features presented below can constitute an aspect of the invention either individually or in combination. The figures show.

DETAILED DESCRIPTION OF THE INVENTION

Figure 1:
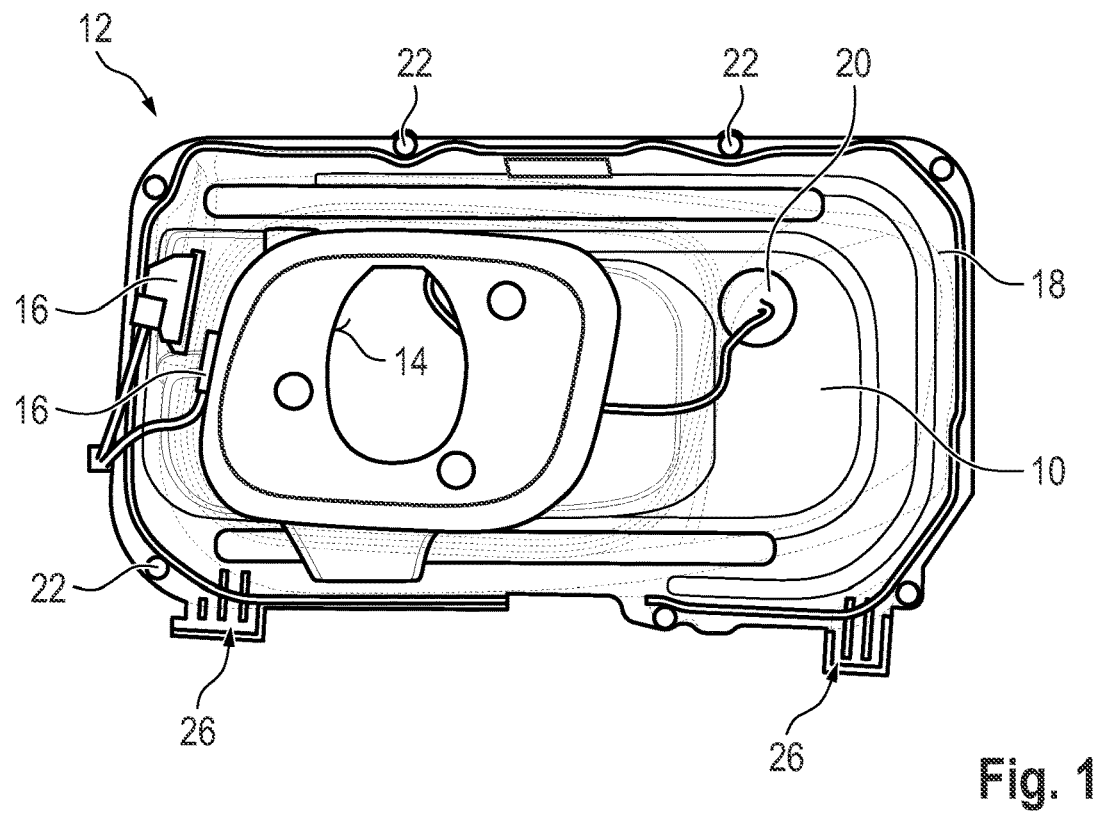
FIG. 1: a schematic plan view of a partially sectioned charging port housing.

The lower shell 10 of a charging port housing 12 shown in FIG. 1 can be provided at a charging opening of a motor vehicle body of an electrically drivable motor vehicle, so that a plug of a charging cable connected to an external power source can be connected through the motor vehicle body to a plug socket of the motor vehicle in order to be able to charge a traction battery connected to an electric machine for driving the motor vehicle. The lower shell 10 comprises a socket opening 14 in which the plug socket can be provided and connected to the lower shell 10. It is also possible that at least one joint element 16 is provided on the lower shell 10, to which a charging flap can be fastened in an articulated manner. The forces and weight forces that occur when the charging flap is actuated can be supported on the lower shell 10 via the joint element 16.

An upper shell 18 can be fastened to the lower shell 10, so that a hollow intermediate space can be formed between the lower shell 10 and the upper shell 18 in which, for example, an electrical component 20 can be provided. The electrical component 20 can be an in particular grounded and/or potential-free ground conductor, for example, which can be connected at one end to the plug socket as a protective conductor and at another end in particular to the metallic motor vehicle body. The lower shell 10 can be connected to the upper shell 18 via fastening means 22, for example configured as a screw connection, in particular in a common flange region.

Figure 2:
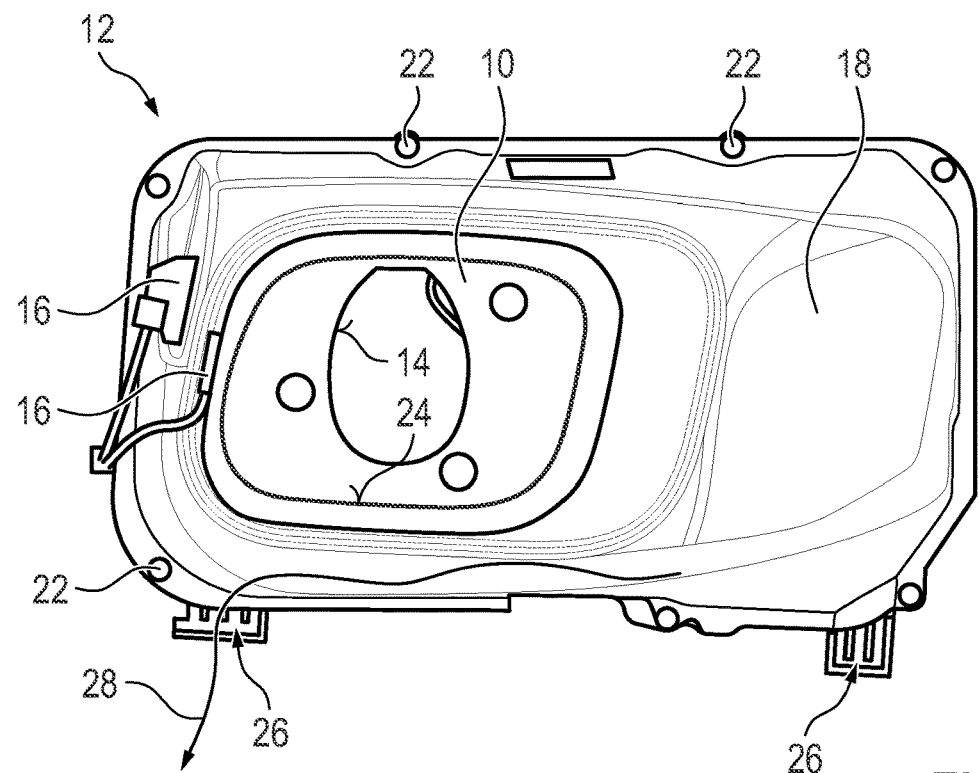
FIG. 2: a schematic plan view of the charging port housing of FIG. 1 in a first tilted position.
Figure 3:
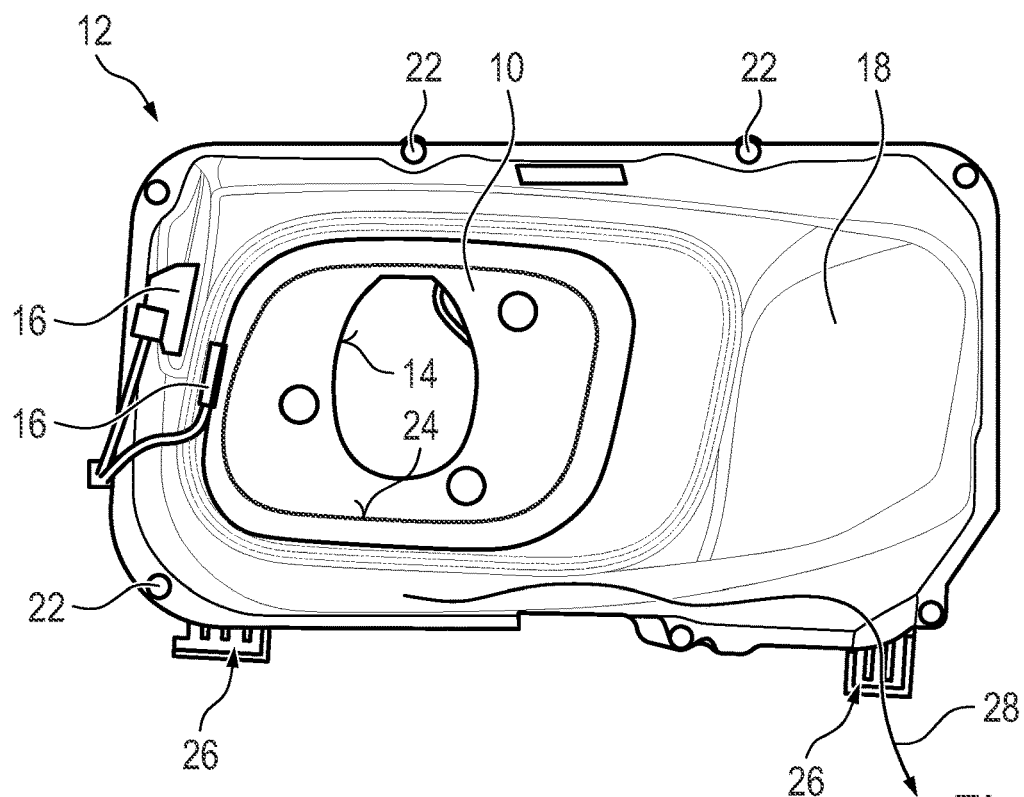
FIG. 3: a schematic plan view of the charging port housing of FIG. 1 in a second tilted position

As shown in FIG. 2, upper shell 18 can cover the at least one electrical component 20. The upper shell 18 comprises a through-opening 24 which can be closed by the charging flap, via which a plug of the charging cable can be brought close to the plug socket in the socket opening 14 of the lower shell 10. However, this also makes the intermediate space formed between the lower shell 10 and the upper shell 18 accessible to splash water. For this purpose, at least one drain opening 26 is provided in each of the lower corner regions of the intermediate space, via which liquid 28 accumulating in the intermediate space can be discharged. Due to the arrangement in the corner regions, the respective drain opening 26 can be positioned at the lowest location in the direction of gravity even when the motor vehicle and the charging port housing 12 are tilted in a first tilting direction, as shown in FIG. 2, or when the motor vehicle and the charging port housing 12 are tilted in a second tilting direction opposite to the first tilting direction, as shown in FIG. 2.

Figure 4:
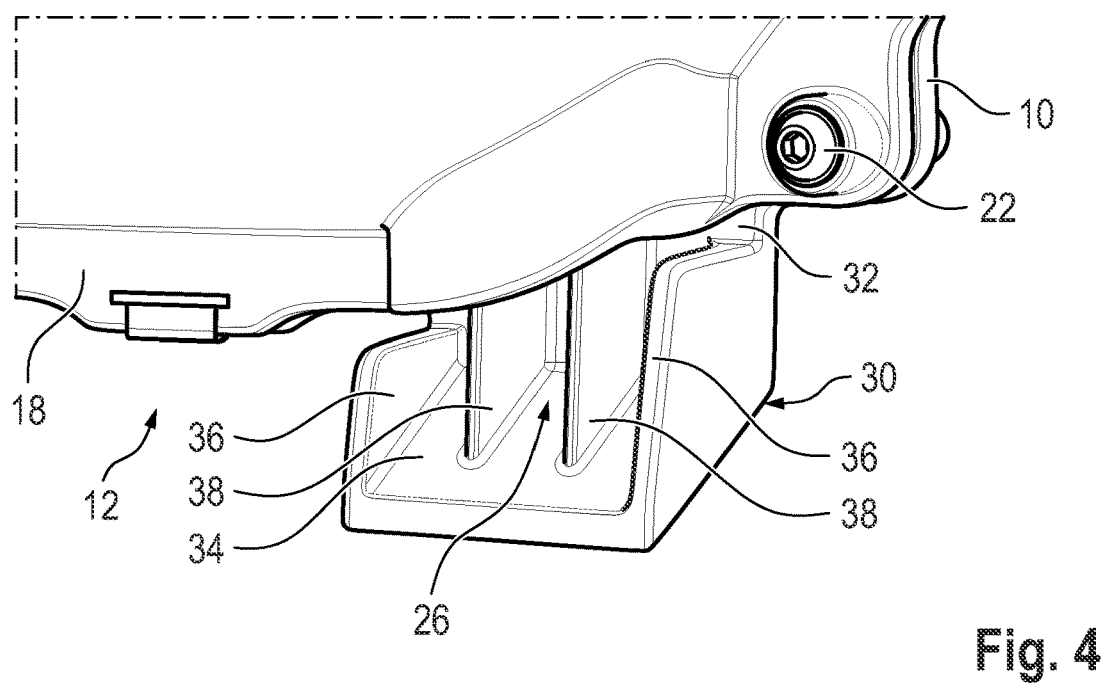
FIG. 4: a schematic detail view of the charging port housing of FIG. 1.

As shown in FIG. 4, the respective drain opening 26 is bounded exclusively by the lower shell 10 and the upper shell 18. The lower shell 10 comprises an edge piece 30 which projects downward in the Z-direction and comprises a tab 32 which projects in the Z-direction from the drain opening 26 and a drainage ramp 34 which projects from the lower free end of the tab 32 at an angle to the Z-direction. First ribs 36 and second ribs 38 are connected to both the tab 32 and the drainage ramp 34. The first ribs 36 are provided on a lateral edge of the drainage ramp 34 and can prevent the liquid 28 from dripping off the side of the drainage ramp 34. The drainage ramp 34 and the lateral first ribs 36 can form a U-shaped drainage channel for draining liquid 28 emerging from the drain opening 26. The second ribs 38 extend into the drain opening 26 and can abut the upper shell 18 with a pressing force that provides sufficient sealing force and reinforce the edge piece 30 in a torsion-resistant manner. In a tilted position, the ribs 36, 38, too, can act as a drainage ramp and together with the drainage ramp 34 form a V-shaped drainage channel.

What is claimed is:

1. A charging port housing for selectively connecting a charging cable provided for charging an electrically drivable motor vehicle, said charging port housing comprising:

a lower shell which is configured to be positioned at a charging opening of a motor vehicle body, wherein the lower shell comprises a socket opening for receiving a plug socket for the charging cable, and an upper shell fastened to the lower shell, wherein the upper shell comprises a through-opening through which the charging cable can pass to the plug socket, at least one drain opening, which is bounded by both the lower shell and the upper shell, for the gravity-driven drainage of liquid, and an intermediate space for receiving live wires electrically connected to the plug socket, wherein the intermediate space is arranged between the lower shell and the upper shell, wherein the at least one drain opening communicates with the intermediate space.

2. The charging port housing according to claim 1, further comprising at least two of the drain openings, which are spaced apart from one another in a direction transverse to a Z-direction.

3. The charging port housing according to claim 1, wherein the at least one drain opening is disposed in a corner region of the intermediate space, wherein, when the charging port housing is inclined relative to a direction of gravity, the drain opening is positioned at a lowest point of the intermediate space with respect to the direction of gravity.

4. An electrically drivable motor vehicle comprising an electric machine for driving the motor vehicle, a rechargeable traction battery connected to the electric machine for storing and supplying electrical energy, a plug socket connected to the traction battery for charging the traction battery with external electrical energy, a motor vehicle body and the charging port housing according to claim 1 provided at a charging opening of the motor vehicle body, wherein the plug socket is fastened in the socket opening of the lower shell.

5. A charging port housing for selectively connecting a charging cable provided for charging an electrically drivable motor vehicle, said charging port housing comprising:
- a lower shell which is configured to be positioned at a charging opening of a motor vehicle body, wherein the lower shell comprises a socket opening for receiving a plug socket for the charging cable,
- an upper shell fastened to the lower shell, wherein the upper shell comprises a through-opening through which the charging cable can pass to the plug socket,
- at least one drain opening, which is bounded by both the lower shell and the upper shell, for the gravity-driven drainage of liquid, and
- an edge piece which (i) forms an edge of the drain opening, (ii) is spaced apart from the drain opening in a Z-direction, and (iii) forms a drainage ramp which is beveled in the Z-direction and leads away from the drain opening.

6. The charging port housing according to claim 5, further comprising at least one rib which projects upward from the drainage ramp with a component in the Z-direction.

7. The charging port housing according to claim 6, wherein the at least one rib forms a side wall which delimits a flow cross-section and/or a stabilizing rib which is spaced apart from an edge of the drainage ramp and stiffens the drainage ramp.

8. The charging port housing according to claim 6, wherein, when the charging port housing is inclined relative to a direction of gravity, the at least one rib forms a drainage ramp for draining liquid.

\* \* \* \* \*